United States Patent [19]
Windhab et al.

[11] Patent Number: 5,264,234
[45] Date of Patent: Nov. 23, 1993

[54] METHOD FOR CONTINUOUSLY CONTROLLING THE TEXTURE AND CRYSTALLIZATION OF FLUID FOOD MATERIALS

[75] Inventors: Erich Windhab, Quakenbrueck; Ludwig Rolfes, Loeningen; Peter von Holdt; Lutz Hahn, both of Gross Groenau, Fed. Rep. of Germany

[73] Assignee: Schroeder & Co. Maschinenfabrik, Luebeck, Fed. Rep. of Germany

[21] Appl. No.: 922,539

[22] Filed: Jul. 30, 1992

[30] Foreign Application Priority Data

Aug. 1, 1991 [DE] Fed. Rep. of Germany ....... 4125463

[51] Int. Cl.$^5$ ............................................... A23G 1/00
[52] U.S. Cl. .................... 426/519; 426/524; 426/660
[58] Field of Search ................. 426/519, 660, 520, 524

[56] References Cited

U.S. PATENT DOCUMENTS

| | | | |
|---|---|---|---|
| 2,507,477 | 5/1950 | MacDonald et al. | 426/519 |
| 3,962,473 | 6/1976 | Lilov | 426/660 |
| 4,859,483 | 8/1989 | Sollich | 426/660 |
| 4,865,856 | 9/1989 | Groen | 426/660 |
| 5,141,328 | 8/1992 | Dilley | 165/109.1 |

*Primary Examiner*—George Yeung
*Attorney, Agent, or Firm*—Richard S. Roberts

[57] ABSTRACT

A process and apparatus for continuously controlling the crystallization of material systems in particular fat containing substances, such as chocolate masses by a thermal treatment which entails cooling and heating. The cooling process is far stronger than under the traditional procedural method, is in fact so strong that under static conditions it would cause the material system that is to be processed to solidify and harden spontaneously. This solidification is prevented by a heating process which uses mechanical energy resulting from shear stress, in a shear flow, where the introduction of mechanical energy and hence the local temperature are spontaneously and sensitively adjustable. This permits the achievement of particular pre-determinable crystal modifications, and hence of specific desired properties in the final product. The treatment states place within a mechanism consisting of a cylindrical container and a rotor, driven rotationally, whose rotational speed is adjustable. Between a cooling jacket and the rotor is a shear gap, in which the mechanical energy for the production of heat is transferred to the material system that is to be processed. The energy transfer is for practical purposes adjustable without any time delay. Crystallization times are sharply reduced, rendering the entire mechanism smaller and more economical to operate. Only one tempering (or temperature) zone is necessary. The product leaves the apparatus at processing temperatures with a defined viscosity.

10 Claims, 3 Drawing Sheets

METHOD FOR CONTINUOUSLY CONTROLLING THE TEXTURE AND CRYSTALLIZATION OF FLUID FOOD MATERIALS

BACKGROUND OF THE INVENTION

The invention pertains to process and an apparatus for continuously controlling the texture, in particular the crystallization, of material systems in the fluid state, in particular fat containing substances, such as chocolate masses. This is accomplished through a thermal treatment by cooling and counteractive heating wherein the cooling is done to such an extent that when the material system is in a state of rest it spontaneously solidifies, and that heating is done by means of energy dissipation through a mechanically adjustable energy supply resulting from shearing stress.

The contents of many food products include, among other raw materials, varying percentages of animal and/or vegetable oils and/or fats, or combinations of these (for example chocolate, butter and margarine), in crystallized form.

The final products owe their essential and characteristic properties to these crystallizable material systems.

Until now, crystallizable material systems have been frequently cooled in thermally controlled scraper heat exchangers or in double-walled containers (with jacket cooling, and an agitator equipped with scrapers), undergoing mechanical blending at temperatures below their freezing point, with variable efficiency in terms of speed. Most fats and fatty mixtures have the property of forming various polymorphic structures of their fatty crystals with different configurations of their fatty molecules (for example in the case of cocoa butter, $\alpha$, $\gamma$, $\beta'$, and $\beta$-crystal modifications). The stability of these crystal modifications differs widely, and is responsible for the consistency, texture, surface luster (for example in chocolate) and mechanical properties of the final product (hard-soft, short-long structure, plastic/elastic-brittle, sticky-dry, gritty-smooth).

With the machines and types of apparatus that have been known up until now, temperature and duration control, as well as temperature gradients during cooling and reheating are only regulated on an empirical basis for different kinds of matter systems. Hence the particular fixed crystal modifications for the achievement of specific properties can only be obtained fortuitously.

One such apparatus is known, for example from DE-PS 39 13 941 and EP-OS 289 849.

As a measure of the blending intensity involved, shear gradients of from 500 to 4000 $s^{-1}$ are produced. With regard to the square of the number of rotations and hence the shear gradient dependent dissipated mechanical energy, this means a maximum difference in conditions of up to a factor of 64. Deliberately introducing mechanical energy while the highly sensitive crystallization processes are reaching fruition is out of the question here.

In addition, the significance of the size of "shear gradients" is limited to laminar layer flows, which means that the quantification used here of a "blending vortex" cannot properly be described by means of data about the shear gradient.

In this context it has not previously been thought to use a targeted supply of dissipated mechanical energy as a "heat source" as well as a structure-inducing means of non-vorticized, genuine shear flow.

From the earlier, non-published DE-P-41 03 575.5 a procedure is known for cream or butter crystallization which produces a more easily spreadable final product. This procedure works by introducing mechanical energy into a so-called "shear gap crystallizer", consisting of an external cylinder and a concentric internal cylinder which is rotationally driven.

What this model presents is the introduction of a constant supply of mechanical energy, for uniform and homogeneous blending purposes. There is no notion of an energy-dissipation-controlled operating method using control of number of revolutions. As in other crystallization procedures of the traditional kind, the thermal regulation of the operation takes place solely through appropriate temperature adjustment by means of a heating or cooling agent.

The invention's central task is to produce a process and apparatus as designated at the outset, which make possible the achievement of crystal modifications according to desired specifications, and hence of particular desired properties in the final product, in such a way as to be reproducible.

This task is essentially performed by means of process and an apparatus designed to carry out this process which are hereinafter described.

In practical terms, the present invention calls for a shear crystallization, conducted at a low temperature; in other words crystallizable material systems are subjected to a mechanically induced low-temperature crystallization. Cooling takes place, as directed by the invention, at crystallization temperatures that are extremely low relative to the state of existing technology. Using "counter-control", by the application of heat with the help of the uniform and homogeneous introduction of mechanical energy, an astonishingly flawless product is achieved with predominantly stable crystalline forms and within a sharply reduced time-frame. Heating by means of the introduction of mechanical energy takes place immediately and without any mentionable delay for all practical purposes. This makes possible an appropriately sensitive control mechanism, measuring for instance the viscosity of the material system that is being processed.

In other words, the cooling of the material system that is to be crystallized takes place to such a massive extent, according to the invention, that the system would spontaneously solidify and harden under static conditions as a material system. Through the introduction of mechanical energy, which proceeds with uniform homogeneity because of the gap geometry that has been effected, energy is dissipated with regular uniformity in the material system. This leads to the heating of the material system, which counteracts the spontaneous crystallization which would otherwise result from the low cooling temperature. Simultaneously the shear flow, at the low temperature levels deliberately selected for this reason, has the particular effect of causing distinct orientation conditions to be initiated for macromolecular components, which thereafter adopt what are apparently preferred "positions" for the formation of crystalline structures. The shear induced alignment of molecular units, and likewise the simultaneous extreme supercooling that takes place on the contact wall of the container, bring about an extremely sharp acceleration of seed-crystal formation and crystal growth.

In contrast to the state of the art, the present invention achieves a homogeneous introduction of mechanical energy as a result of the characteristic feature of its construction, namely a constant shear gap distance over the entire stressed cross section. The effect of this is that at any point on the shear gap in which the substance that is to be crystallized is subjected to stress, the introduction of mechanical energy is in an exceptionally strict sense constant; in other words energy is dissipated regularly and simultaneously in the material system.

The rapid seed-crystal formation leads to a large number of seeds, hence prevents the formation of a small number of large-size crystals (this large-growth pattern means a gritty final product). Besides, the predominance of the formation of the desired stable or unstable crystal modifications while the material system is undergoing polymorphic crystallization can be regulated to fixed specifications, using the introduced shear-energy. The sharply accelerated crystallization kinetics generated by the invention's prescribed mechanism means that small "reaction volumes" (free crystallizer volume-capacity) can be produced, through which flow can continuously pass. Shorter crystallization times are required for specific, fixed material systems, also smaller heat-exchange surfaces and reaction containers, and less cooling energy and less electrical energy, because smaller vessels are being used. Material systems investigated by way of examples from the area of fats (namely cocoa butter) exhibit crystallization times which, relative to crystallization treatment of the traditional kind, are shorter by a factor of more than 100.

The regulating process is by no means a slow-moving operation, but with no difficulty it can occur with the requisite speed and sensitivity to ensure a regular and uniform product. According to the invention's prescribed mechanism, this is done by adjusting the setting of the rotor's revolutions. This adjustment, short-term and massive, can be set to any degree desired, making for an extremely brief manipulation of the energy conditions in the shear gap. Determining a specific introduction of mechanical energy depends on the product's retention-time in the gap, i.e. its gap geometry, as well as the product-volume flow and the number of revolutions of the shaft.

The term "shear flow" as used in this description, means a smooth flow in which the molecular components of the material system are moved and aligned in parallel "layers" relative to one another. This alignment produces projected positions for the system's material components (such as fatty molecules) in relation to each other, making it easier to "latch" into a crystal lattice. This substantially speeds up the crystallization kinetics.

Provided the apparatus is developed according to the invention's specifications, as stated herein, fullest benefit can be drawn from the introduction of mechanical energy as a standard regulating parameter for crystallization conditions. Depending on a specifically fixed starting level for viscosity, the apparatus is so to speak "viscosity-controlled", namely by means of modifications made to the introduction of mechanical energy, in other words the setting of the rotor's revolutions.

The container's wall is "strongly cooled", as per the invention's prescription. During this process the danger of "freezing up" is avoided, since the substance that is to be crystallized is only allowed to experience "low-temperature shock" on the contact surface. Hence it forms seed-crystals at a rapid rate; but these seed-crystals then generate a blend temperature in combination with the substance that has not come into contact with the wall, and this prevents a rapid re-solidification and re-hardening. The introduction of mechanical energy needs to be apportioned so as to ensure that an over-strong localized heat-up is avoided, in order to inhibit the desired stable crystals that have already formed from re-melting.

Compared to the well-known procedural method for obtaining the crystallization of a multiplicity of macromolecular material systems, the mechanism specified by this invention yields substantial time advantages (by up to a factor of 100), as well as considerable economic advantages, due to the reduction in capital investments which is brought about by the markedly reduced crystallizer volume-capacity.

In principle only one temperature adjustment zone (or temperature zone) is really necessary, namely cooling alone, as against the 2-3 zones (cooling and heating) required by the familiar mechanisms that have been in use to date. The pre-crystallized substance leaves the mechanism with a specifically fixed viscosity, and in a state directly susceptible to processing and finishing (no subsequent reheating is needed).

Hereinafter the invention is explained and elucidated in greater detail, with reference to the design, with the aid of a basic main sketch and accompanying examples by way of illustration.

SUMMARY OF THE INVENTION

The invention provides a process for continuously controlling the texture and crystallization of food material systems in the fluid state, which comprises thermal treatment by cooling and counteractive heating, wherein the cooling is effected to such an extent that when the material system is in a state of rest it spontaneously solidifies and that heating is effected by means of energy dissipation through a mechanically adjustable energy supply resulting from shearing stress.

The invention also provides an apparatus for continuously controlling the texture and crystallization of food material systems in the fluid state, by thermal treatment which comprises means for effecting thermal treatment in a continuous flow container, including cooling which is effected by means of the container wall and heating by means of a supply of mechanical energy provided by a revolving rotor which, with the container wall forms a gap for the transfer of shearing stress to the material system, and means for adjusting the rotational speed of the rotor for the direct control of mechanical energy supply.

DETAILED DESCRIPTION OF THE PREFERRED EMBODIMENT

Figure 1:
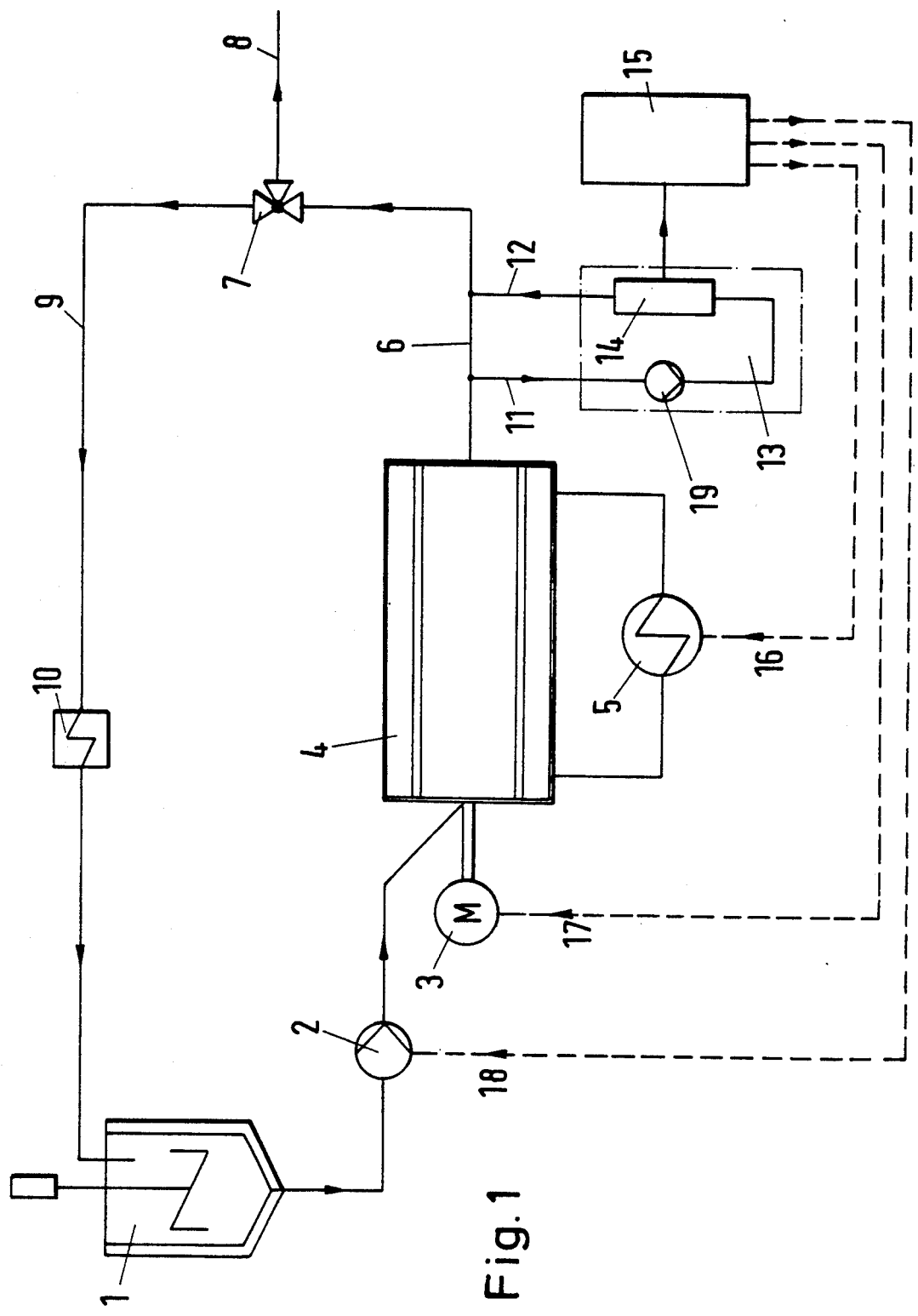
FIG. 1 is a schematic representation of the operating cycle.

The apparatus schematically represented in FIG. 1 consists of a temperature-adjusted container with a stirring device as a prior holding-site for the material system, in this instance cocoa butter. By means of a pump 2, the substance that is to be processed reaches the container or crystallizer 4, which can also be designated as a "low-temperature shear crystallizer". In the crystallizer 4 there is a rotor 21 set up (see FIG. 2), which is driven rotationally by a motor 3. The crystallizer 4 displays a cooling jacket with a cooling cycle 5.

The substance that is being processed passes via a main line 6 to a three-way valve 7 and from there either to the product flow 8 or to the return-outlet 9, in which a heat exchanger 10 is in place.

A bypass line runs in parallel to the main stream 6, with an intake at 11 and a return-outlet at 12. This duct leads to a viscosity gauge 13 with an on-line viscosity meter 14. Control and regulation are conducted by means of an appropriate unit at 15. Cooling is controlled at 16, number of revolutions at 17, and the substance flow at 18. The pump for the viscosity gauge 13 is marked as 19.

Figure 2:
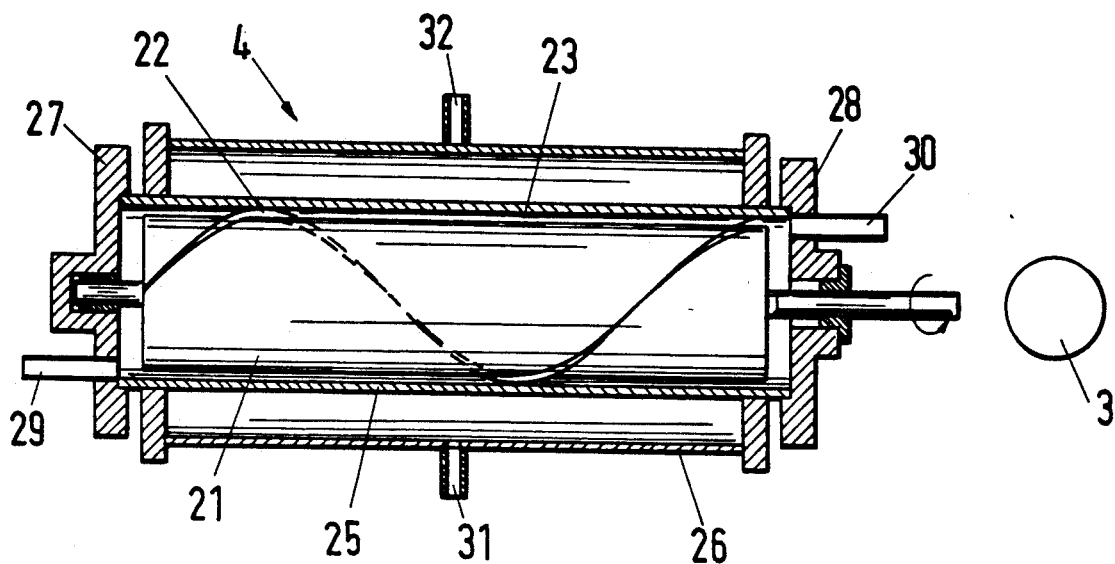
FIG. 2 shows the crystallizer schematically represented in FIG. 1, in longitudinal section.

The diagram in FIG. 2 shows a cross-sectional drawing of the container or crystallizer 4. This consists of the rotor 21 with an accompanying flat spiral screw 22. The space between the rotor 21 and the container's inner wall defines the shear gap 23, in which the shear stress is brought to bear on the product that is to be processed. The stationary cylinder consists of an inner cooling wall 25 and an outer cooling jacket 26. The cooling agent intake-feed takes place at the entry 31, and the cooling agent outlet-feed at the exit 32. The cylinder's front walls are formed by a storage-cover 27 and a seal-cover 28. They serve as support and resting-site for the rotor 21 that is adjustably driven by the motor 3. The product intake-feed takes place at the entry 29, and the efflux of the processed product at the exit 30.

The framework of the invention is flexible enough that the crystallizer can also be formed differently, for instance, the rotor could be cooled by an appropriate hollow-shaft apparatus. Jacket casing and rotor could also undergo cooling, if need be. What is vitally essential is that heating must take place by means of the rotor-assisted introduction of mechanical energy in the shear gap 23.

Figure 3:
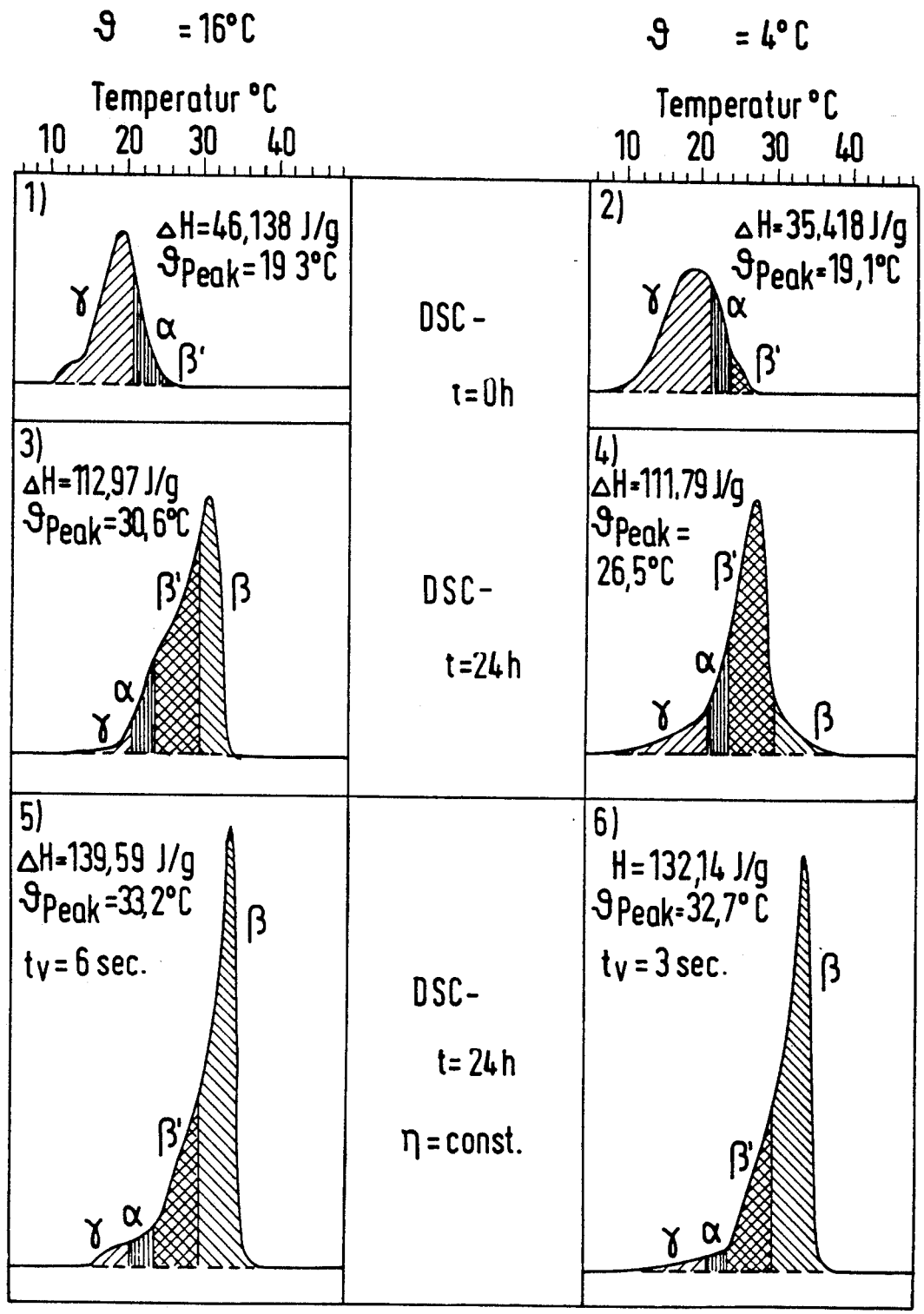
FIG. 3 shows melt enthalpy graphs for cocoa butter as a sample product.

FIG. 3 shows melt enthalpy graphs which were arrived at based on Differential Thermoanalysis (DSC). This analytical method allows the unambiguous differentiation and quantification of the $\gamma$, $\alpha$, $\beta'$, and $\beta$ crystal modifications arising for fats (in this case cocoa butter).

In order to achieve the requisite quality for foodstuffs containing cocoa butter, such as chocolate and fatty glazes (surface luster; breaks with a clean snap; melts smoothly), the cocoa butter, particularly the cocoa butter containing material system, needs to be crystallized in such a way that the stable $\beta$-crystals are preferentially formed (approx. >50–60% $\beta$-crystals, <10% $\gamma$ and $\alpha$-crystals).

When processing and finishing the corresponding substances in their fluid form (pouring, coating and blending), the aim is to work with as sharply-defined degrees of viscosity as possible, so as to ensure reproducible product management and product quality. Substances of this kind are as a rule processed and finished in their so-called "pre-crystallized" or "temperature-adjusted" form. This means that the crystals receiving consideration in this state have to be predominantly stable $\beta$-crystals; and the proportional share of these crystals is regulated so that the substance that is to be processed as a fluid does in fact possess the desired viscosity. As a rule the crystalline portion of pre-crystallized substances is of the order of approx. <5% by volume. The cooling temperature normally selected for pre-crystallization, for fluids containing cocoa butter, lies between 25–29° C. (substance temperature) for a wall temperature range of 16–25° C. Processing times vary between 10 and 30 minutes. A sharply-defined viscosity setting has not been possible up until now, but could only result by the temperature setting, since the operation is determined by retention-time (or flow-through rate).

In contrast to this traditional procedural method, the new low-temperature shear crystallization procedure chooses extremely low crystallization temperatures (cf. FIG. 3: 2 examples, 16° C. and 4° C.). When cocoa butter has solidified statically at these temperatures, selected as examples, a very unstable "crystalline structure" (cf. FIG. 3(1) and FIG. 3(2), predominantly $\gamma$ and $\alpha$-form) appears directly after solidification, which even after 24 hours' storage still exhibits clearly unstable features (cf. FIG. 3(3) and FIG. 3(4), too few $\beta$; predominantly $\beta'$ and $\alpha$). The test sample, which solidified at 4° C., crystallizes with increased instability after 24 hours.

Statically solidified test samples of this kind display a plethora of qualitatively negative features (fat-whitening; breaks weakly; roughness).

If, under the same temperature conditions, a fixed introduction of mechanical energy is supplied during low-temperature shear crystallization, to "counter-control" temperature-induced solidification, a flawless product is achieved having predominantly stable crystalline forms ($\beta$) (cf. FIG. 3(5) and FIG. 3(6). The excellence of these products cannot be distinguished from those produced by traditional operating methods. Essential differences emerge from comparison with the traditional type of procedure, on the one hand, the advantage of an easily specified viscosity setting, since the introduction of mechanical energy as a control parameter allows quick and deliberate regulatory intervention in the operation; and on the other hand, very emphatically shortened processing times, which lie at 3 and 6 seconds respectively in the example cited, and hence are reduced by a factor of >100 relative to traditional procedures. This results in very economical working quantities.

Figure 4:
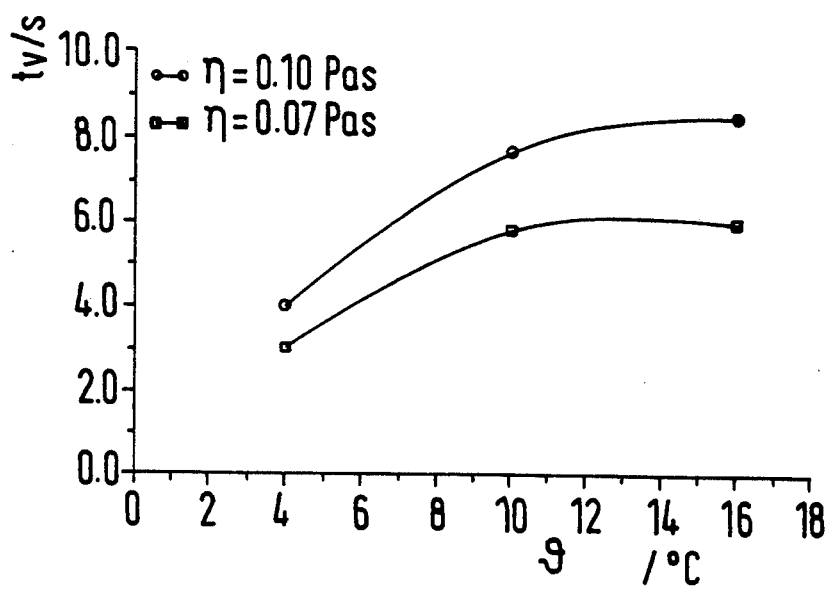
FIG. 4 is a chart for "cocoa butter" as an example, plotting retention-time in the crystallizer as a function of the cooling temperature, for given viscosity settings.

FIG. 4 shows a characteristic graph for cocoa butter, where for each of two fixed example viscosity settings ($\eta = 7 \times 10^{-2}, \eta = 1.0 \times 10^{-1}$ Pas) the retention-time in the crystallizer is plotted as a function of the cooling temperature.

What is claimed is:

1. A method for continuously controlling the texture and crystallization of a food material in the fluid state to produce a food material product whose crystalline parts are at least 50% $\beta$-crystals which comprise cooling the food material to a temperature of from about 4° C. to about 16° C. in a continuous flow cooling cylinder, which cooling is conducted by means of a cooling cylinder wall, which cooling cylinder wall is maintained at a temperature of from about 1° C. to about 70° C. below the freezing temperature of the food material, and simultaneously subjecting the food material to a shearing stress for from about 3 to about 8.5 seconds, said shearing stress being applied to the food material in a gap formed between the cooling cylinder wall and a rotor revolving within the cooling cylinder.

2. The method of claim 1 wherein the rotor has a scraper or a stripper.

3. The method of claim 2 wherein the stripper or scraper is in the form of a flat helix.

4. The method of claim 1 wherein the regulation of the rotational speed of the rotor and the shearing stress applied is effected by on an on-line or in-line viscosity measurement of the treated food material.

5. The method of claim 4 wherein the viscosity of the food material is measured by means of a bypass for the treated food material connected after an outlet from the cooling cylinder.

6. The method of claim 1 wherein the free reaction volume in the gap amounts to 0.1 to 50 liters per 1,000 l/h of throughput of the food material.

7. The method of claim 1 wherein the free reaction volume in the gap amounts to 0.25 to 10 liters per 1,000 l/h of throughput of the food material.

8. The method of claim 1 wherein the food material produced has from about 50% to about 60% of $\beta$-crystals, and less than about 10% $\gamma$ and $\alpha$-crystals.

9. The method of claim 1 wherein the food material comprises a fat containing substance.

10. The method of claim 1 wherein the food material comprises a chocolate mass.

* * * * *